United States Patent
Hong

(10) Patent No.: US 7,862,692 B2
(45) Date of Patent: Jan. 4, 2011

(54) LIQUID EVAPORATING METHOD AND DEVICE

(76) Inventor: Jeong-Ho Hong, 1701-4, Daemyong 5-dong, Nam-gu, Rm. 6-302, Saehan Apt., Daegu (KR) 705-802

( * ) Notice: Subject to any disclaimer, the term of this patent is extended or adjusted under 35 U.S.C. 154(b) by 613 days.

(21) Appl. No.: 11/576,592

(22) PCT Filed: Dec. 20, 2005

(86) PCT No.: PCT/KR2005/004408

§ 371 (c)(1),
(2), (4) Date: Apr. 3, 2007

(87) PCT Pub. No.: WO2006/068405

PCT Pub. Date: Jun. 29, 2006

(65) Prior Publication Data

US 2008/0017326 A1    Jan. 24, 2008

(30) Foreign Application Priority Data

Dec. 24, 2004  (KR) ............... 10-2004-0114511
Jan. 18, 2005  (KR) ............... 20-2005-0001842 U

(51) Int. Cl.
*B01D 1/26* (2006.01)
*B01D 3/02* (2006.01)
*C02F 1/04* (2006.01)
*F25B 39/02* (2006.01)

(52) U.S. Cl. .............. 203/10; 122/459; 159/17.1; 159/24.1; 159/28.6; 159/46; 159/47.1; 202/155; 202/174; 202/176; 202/267.1; 203/21; 203/71; 203/86; 203/DIG. 8

(58) Field of Classification Search ........... 122/459; 159/17.1, 24.1, 28.6, 46, 47.1, 903; 126/694; 202/155, 172–174, 176, 233, 234, 267.1; 203/10, 21, 71, 86, DIG. 1, DIG. 8
See application file for complete search history.

(56) References Cited

U.S. PATENT DOCUMENTS

| | | | | |
|---|---|---|---|---|
| 3,627,646 A | * | 12/1971 | Osdor | ............ 202/93 |
| 4,329,205 A | | 5/1982 | Tsumura et al. | |
| 4,424,098 A | * | 1/1984 | Hartig | .......... 159/13.1 |
| 4,475,988 A | | 10/1984 | Tsumura et al. | |
| 4,586,985 A | | 5/1986 | Ciocca et al. | |
| 4,636,283 A | * | 1/1987 | Nasser | .......... 202/173 |
| 4,680,090 A | | 7/1987 | Lew | |
| 5,139,620 A | * | 8/1992 | Elmore et al. | ........ 203/11 |
| 6,261,419 B1 | * | 7/2001 | Zebuhr | ........ 202/172 |
| 6,309,513 B1 | * | 10/2001 | Sephton | ........ 202/155 |

* cited by examiner

FOREIGN PATENT DOCUMENTS

JP      60-255101      12/1985

*Primary Examiner*—Virginia Manoharan
(74) *Attorney, Agent, or Firm*—Park & Associates IP Law LLC

(57) ABSTRACT

A method of evaporating liquid in a liquid evaporating system having heat exchangers, evaporators, and steam reheaters, includes: preheating condensed water in the heat exchangers; distilling in the evaporators the condensed water from the heat exchangers, wherein the evaporators each has a horizontal plane evaporating chamber at an upper side thereof and a horizontal plane steam heating chamber at a lower side thereof, wherein heating steam is provided from an external boiler to the heating chamber; exchanging heat between the evaporating chamber and the heating chamber using a heat exchange boundary face formed in a concavo-convex shape, wherein the heat exchange boundary face is formed of a metal plate; and reheating in the steam reheaters the steam from the respective evaporators, wherein the reheaters each are coupled to a subsequent one of the heating chambers to serve as a heating source of the subsequent heating chamber.

6 Claims, 5 Drawing Sheets

[Fig.1]
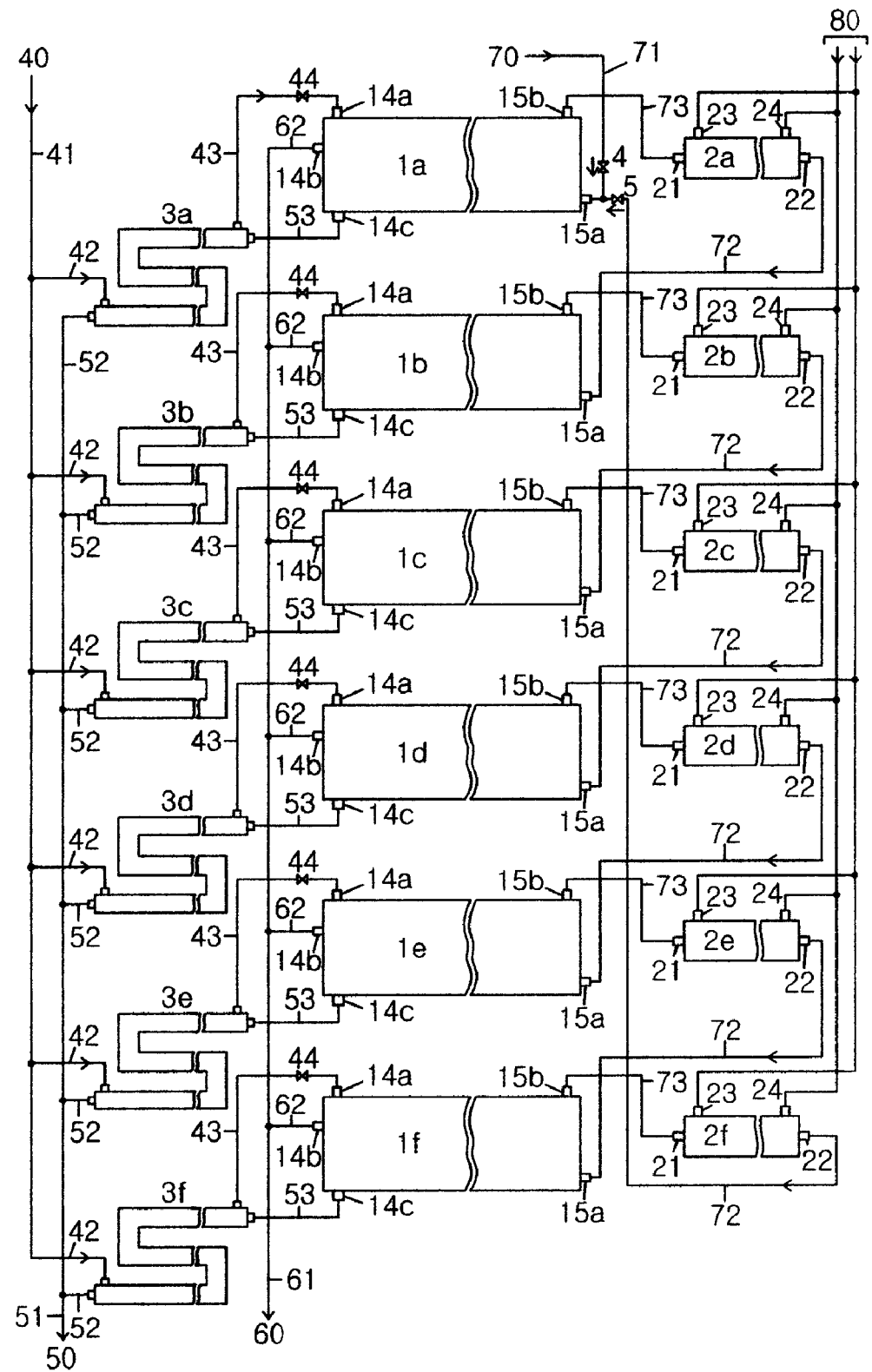

[Fig. 2]
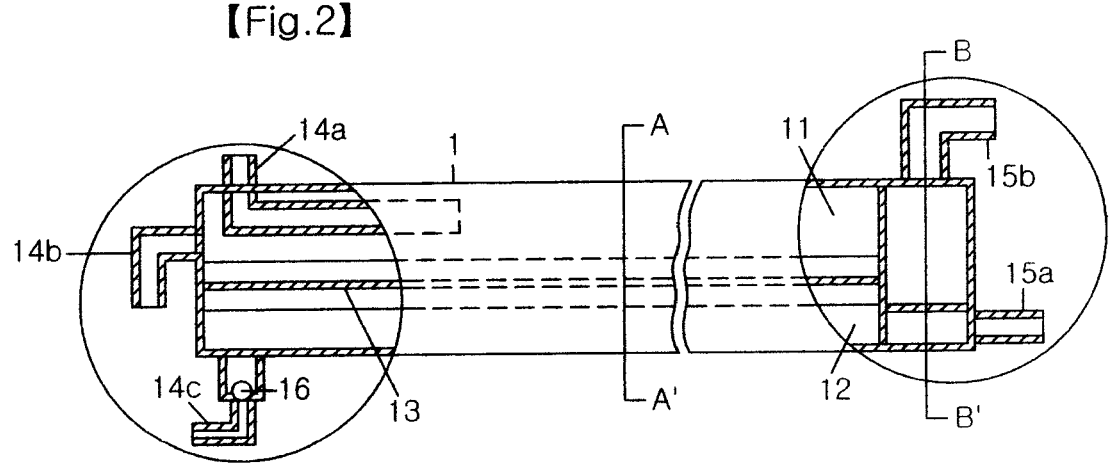
[Fig. 3]
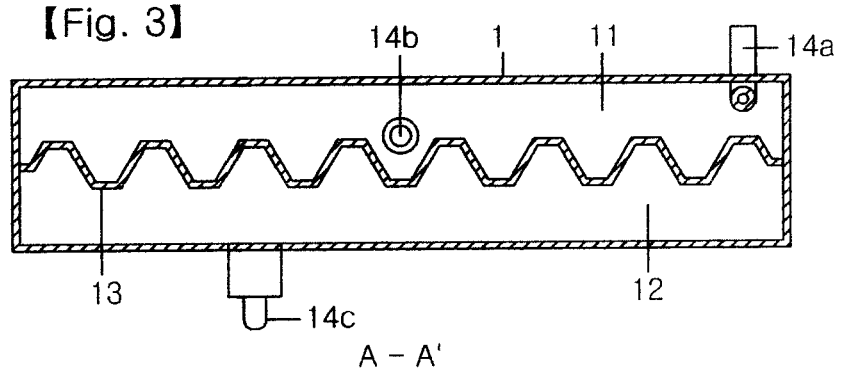
A - A'
[Fig. 4]
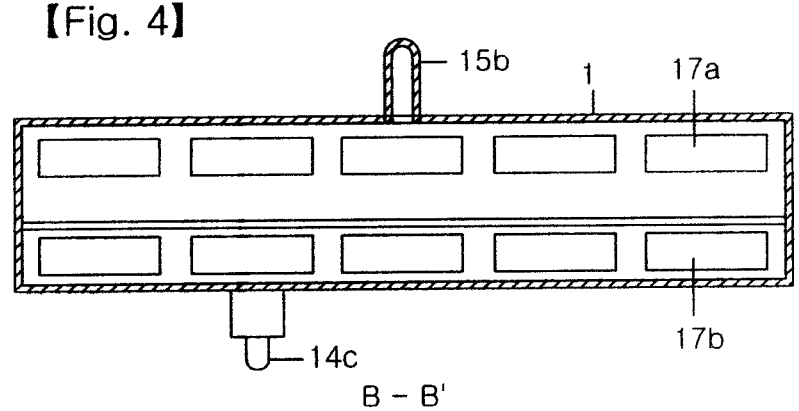
B - B'

[Fig. 5]
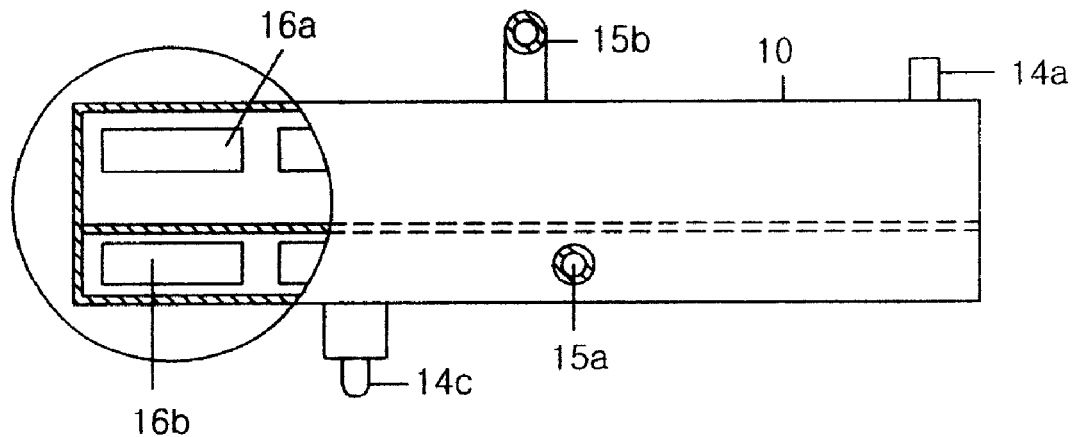
[Fig. 6]
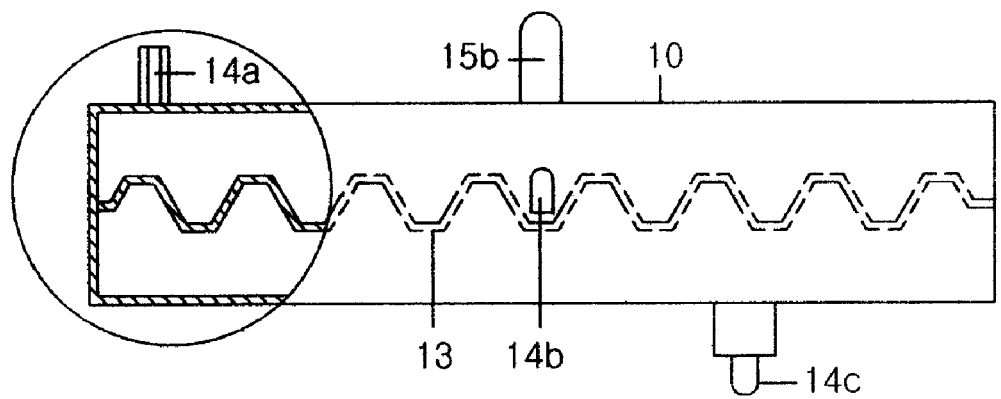

[Fig. 7]
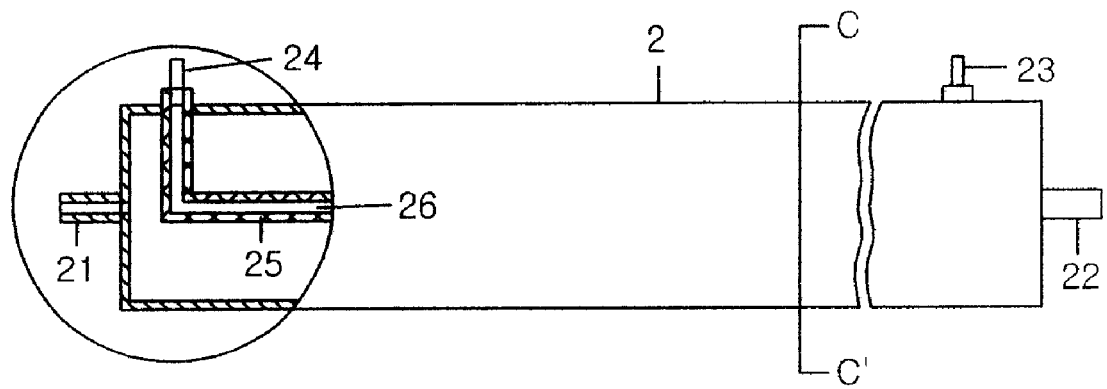
[Fig. 8]
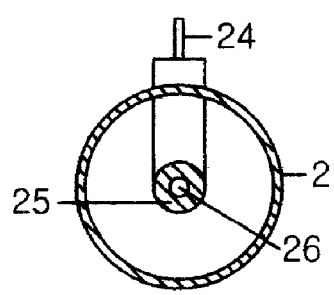
C - C'

【Fig. 9】
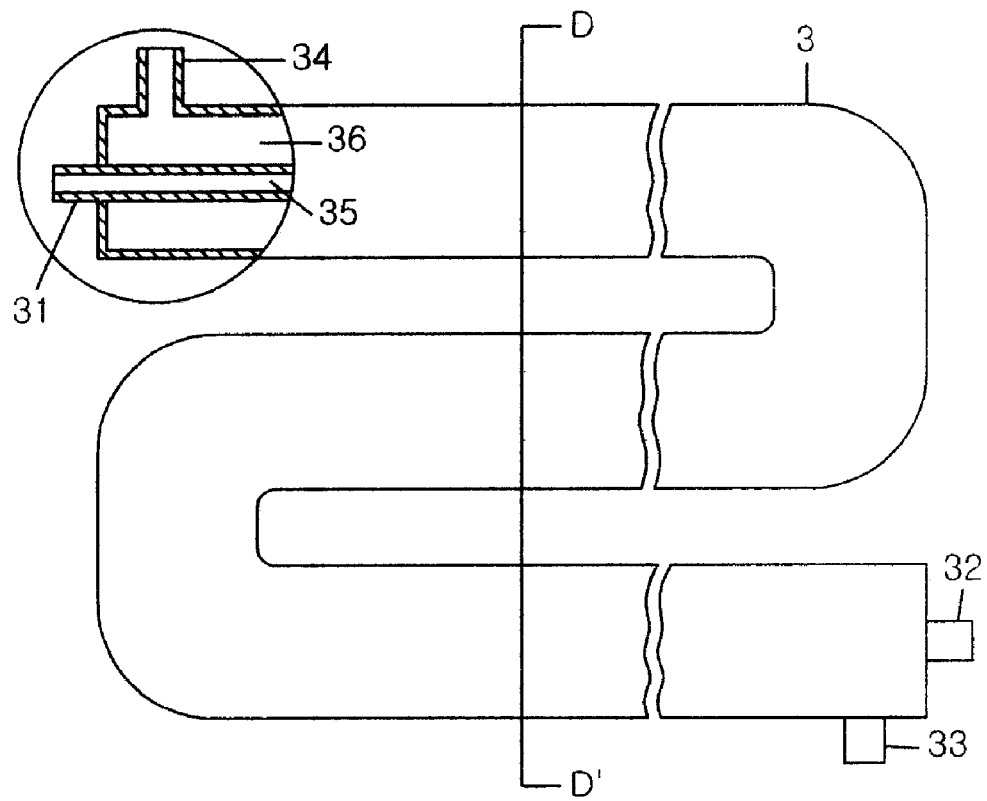
【Fig.10】
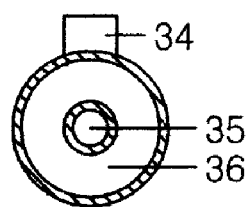
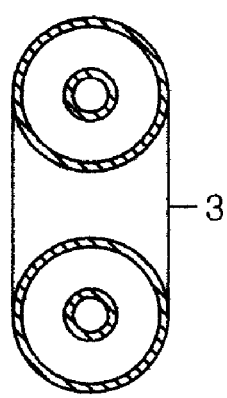
D - D'

LIQUID EVAPORATING METHOD AND DEVICE

TECHNICAL FIELD

The present invention relates to an effective evaporation or distillation method and equipment capable of forming a multiple effective evaporator in the manner that a plural of horizontal plate typed evaporators having a partitioned space into a steam heating chamber and an evaporating chamber are perpendicularly stacked and of using a re-heated steam generated from the horizontal plate typed evaporator as a heat source of a next adjacent horizontal plate typed evaporator, and in particular to a method and equipment capable of evaporating and distilling a salt water or a liquid phased material so that a re-heated steam may be successively and repeatedly evaporated until the re-heated steam is reached at a last horizontal plate typed evaporator in the manner that in a plural of horizontal plate typed evaporators a high temperature steam supplied from a conventional PTC or CPC typed solar heat, or a general steam boiler is provided to only first horizontal plate typed evaporator and a steam is generated from a distillation water and after re-heated a steam generated from first horizontal plate typed evaporator is supplied to second first horizontal plate typed evaporator and a steam is generated from a distillation water at second horizontal plate typed evaporator. So, an initial solar heat or an evaporation from a general evaporation boiler functions as an evaporation source and also evaporation water generated from the horizontal plate typed evaporators gets evaporated. Evaporation from each of the horizontal plate typed evaporators is condensed after a heat is mutually exchanged in a heating chamber at the evaporator, resulting in being changed into high temperature distillation water. The high temperature distillation water makes evaporation water preheated by carrying out a heat exchange with the evaporation water to be flowed into an evaporating chamber and thereby the evaporation water is effectively evaporated.

BACKGROUND ART

For the purpose of enhancing evaporation efficiency, various methods have been used in a most of conventional evaporators. A multiple effective evaporator out of conventional evaporators is to improve the gradual degrading of a steam temperature every when the generated steam is one by one passed through the evaporators in the course of a reusing the generated steam. The improvement is to make an atmosphere pressure of a respective evaporating chamber low using a decompression pump. This requires paying a high expense and having many equipment sources. Further, in constituting a plural of evaporators a maximum number of evaporators are restricted by fourteen evaporators to carry out a multiple effective evaporation. A multiple injection evaporation method which is like as this method also has problems in that it is to have a reducing pressure which is the same problem as a multiple effective evaporation method and in a steam compression evaporation method it is uneconomic to compress a steam and to have a limit of a processing amount, as well as a big structure.

DISCLOSURE

Technical Problem

The present invention is designed in consideration of the above problems, and therefore it is an object of the invention to provide an effective evaporation or distillation method and equipment capable of being formed in a plate shape and stacked with multiple layer structures, thereby minimizing an occupied space on an evaporation system and reheating a steam generated from an evaporation and then it is easy to generate the steam without the reducing pressure of the evaporation at an evaporating chamber, resulting in constituting the effective evaporation system. In such effective evaporation system, a plural of evaporators are consisted of more compared to the other evaporation method and also it is economic to re-heat the steam, that is, the increasing of the steam temperature with its compression by 10° C. requires the consumption of 15 kcal/kg, but the increasing of the steam temperature with its direct heat by 10° C. requires the consumption of 3.8 kcal/kg.

Technical Solution

In order to accomplish the above object, the present invention provides a multiple effective evaporation equipment in a steam reheating method comprises: a plate typed horizontal evaporator having a partitioned space into upper and lower, which includes a heat exchange boundary face formed in a concavo-convex shape which has a wide heat exchange area to effectively carry out a heat exchange at the mediate of the horizontal typed evaporating chamber and the heating chamber and made of a metal plate such as aluminum or copper having a high thermal conductivity. The multiple effective evaporation equipment is a construction formed in a multiple stacked method. The steam reheating unit can individually re-heat the steam from the respective evaporator. The condensed distillation water from the respective evaporating chamber and the evaporation water to be flowed into the evaporating chamber are mutually cross-encountered at a heat exchanger to make to be preheated. In case of using solar heat steam boiler equipment may be constituted in a condensation typed solar heat method having a parabolic reflector. The present invention is characterized in having a structural big volume and an occupation on a wide space with regard to that a thermal exchange method using a conventional metal tube is used in evaporating. Also, it may be uneconomic in view of adiabatic, operational, vacuum, or compression cost. The present invention has an evaporator having a plate shape and a small spatial occupation with a multi-stacking. Because of a multi stacked evaporator in view of operation, it is to enhance an energy re-using efficiency and to reduce an evaporation cost. Moreover, it is to be able to evaporate salt water or a liquid phased material using a solar heat even where energy supply is not smooth.

ADVANTAGEOUS EFFECTS

By using an effective evaporation or distillation method and equipment according to the present invention, when a steam generated from a solar heat or a steam boiler is distillated or evaporated at first evaporator in a plural of evaporators and successively the other evaporators makes an evaporation of its next adjacent evaporator to be carried out without the reducing pressure by a re-heated steam generated from itself, and thereby enhancing an evaporation efficiency as much as its double number.

DESCRIPTION OF DRAWINGS

FIG. 1 is an elementary construction view of a multiple effective evaporation system using a re-heated steam in the structure of a horizontal plate typed heat exchanger;

FIG. 2 is a detailed side view of evaporator in the structure of a horizontal plate typed heat exchanger according to the present invention;

FIG. 3 is a cross-section view taken along A-A' line of FIG. 2;

FIG. 4 is a cross-section view taken along B-B' line of FIG. 2;

FIG. 5 is a right front view of FIG. 2;

FIG. 6 is a left front view of FIG. 2;

FIG. 7 is a side view showing a steam reheating device in an electric heating method;

FIG. 8 is a cross-section taken along C-C' line of FIG. 2; and

FIG. 9 is a front view of a heat exchanger in a double method; and

FIG. 10 is a cross-section taken along D-D' line of FIG. 9.

BEST MODE

Hereinafter, an effective evaporation or distillation equipment according to the present invention will be described in detail referring to the accompanying drawings.

A multiple effective evaporation equipment in a steam reheating method according to the present invention comprises: an evaporator 1 consisting of a horizontal typed evaporating chamber 11 positioned at its upper for making evaporation water 40 evaporated, a horizontal steam heating chamber 12 positioned at its lower for making evaporation water 40 heated, and a heat exchange boundary face 13 formed in a concavo-convex shape which has a wide heat exchange area to effectively carry out a heat exchange at the mediate of the horizontal typed evaporating chamber 11 and the heating chamber 12 and made of a metal plate such as aluminum or copper having a high thermal conductivity; a plural of multiple effective evaporators 1a, 1b, 1c, 1d, 1e, and 1f, each having perpendicularly stacked numbers of evaporator 1, for making an evaporation exhaustion hole 15b upward tilted so that a sum of a condensation water generated from the horizontal steam heating chamber 12 in the evaporator 1 and the remaining water generated from the horizontal typed evaporating chamber 11 may be drained; a plural of steam reheating units 2a, 2b, 2c, 2d, 2d, 2e, and 2f for being individually installed every evaporator 1, in the high temperature evaporation, electric heating, or conventional PTC typed or CPC typed solar thermal heating manner that a steam generated from the respective evaporator 1 is re-heated before the re-heated steam is used as a heating source on a next successive evaporator 1 adjacent to the corresponding evaporator 1; and a plural of double tube typed heat exchanging units 3a, 3b, 3c, 3d, 3e, and 3f for being individually installed every evaporator 1 so that the evaporation water 40 may be preheated as a condensed distillation water. In detail as shown in FIG. 2, a multiple effective evaporation equipment in a steam reheating method according to the present invention comprises: evaporator 1 consisting of a horse 43 for supplying an evaporation water 40, an evaporation water supplying socket 14a for a throttle valve connection, and a remainder water drain socket 14b for connecting an evaporation remaining water drain horse 62, which is positioned one end of at a plate typed evaporation chamber, an evaporating chamber 11 coupled to a steam drain socket 15b for connecting a steam drain horse 73 formed at other end of the plate typed evaporation chamber, which is positioned at its upper, a condensation water drain socket 14c for connecting a condensation water drain horse 53, which is positioned at one end of a plate typed steam heating chamber, a steam heating chamber 12 of the evaporator 1 coupled to a high temperature steam socket 15a for connecting a high temperature steam horse 72 positioned at other end of a heating chamber wherein the steam heating chamber 12 is positioned at its lower, and a heat exchange boundary face 13 formed in a concavo-convex shape which has a wide heat exchange area to effectively carry out a heat exchange at the mediate of the horizontal typed evaporating chamber 11 and the heating chamber 12 and made of a metal plate such as aluminum or copper having a high thermal conductivity; a plural of multiple effective evaporators 1a, 1b, 1c, 1d, 1e, and 1f, each having perpendicularly stacked numbers of evaporator 1, for making an evaporation exhaustion hole 15b upward tilted so that a sum of a condensation water generated from the horizontal steam heating chamber 12 in the evaporator 1 and the remaining water generated from the horizontal typed evaporating chamber 11 may be drained; a plural of steam reheating units 2a, 2b, 2c, 2d, 2d, 2e, and 2f for being individually installed every evaporator 1, in the high temperature evaporation, electric heating, or conventional PTP typed or CPC typed solar thermal heating manner that a steam generated from the respective evaporator 1 is re-heated before the re-heated steam is used as a heating source on a next successive evaporator 1 adjacent to the corresponding evaporator 1; and a plural of double tube typed heat exchanging units 3a, 3b, 3c, 3d, 3e, and 3f for being individually installed every evaporator 1 so that the evaporation water 40 may be preheated as a condensed distillation water.

In such multiple effective evaporation equipment in a steam reheating method as shown in FIG. 1, the evaporation water 40 is supplied to the evaporation water supplying socket 14a, via the horses 41, 42, and 43 in the respective evaporator 1, an external tube 36 in the double tube typed heat exchanging units 3a, 3b, 3c, 3d, 3e, and 3f, and a throttle valve 44 for adjusting a fluid, and a solar heat, or a high temperature steam generated from a general steam boiler is with the horse 72 supplied to the high temperature steam socket 15a in the steam heating chamber 12 of the first evaporator 1a, via a high temperature steam horse 71 and a check valve for inhibiting a reverse flow. The remainder water drain socket 14b is coupled to one end of the drain horse 62, and other end of the drain horse 62 is in parallel to the remainder water drain horse 61, a condensation water through a steam trip 16 of the respective evaporator 1 is in parallel coupled to the remainder water drain horse 51, via the condensation water drain socket 14c, a condensation water drain horse 53, and an internal tube 35 of the double tube typed heat exchanger of the respective evaporator 1. The remainder water drain socket 15b of the respective evaporating chamber from the second evaporator 1b to the last evaporator 1f is with the steam horse 73 coupled to a steam inflow socket 21 of the corresponding steam reheating equipment 2b, 2c, 2d, 2e, and 2f, and a steam drain socket 22 of the corresponding steam reheating equipment 2b, 2c, 2d, 2e, and 2f is with a horse 72 coupled to a steam supply socket 15a of the successive evaporator 1 next to the corresponding evaporator 1. Also, a re-heated steam of the lowest last evaporator 1f is supplied to a steam horse coupled in parallel with a boiler steam horse to a high temperature steam socket via a check valve for inhibiting a reverse flow.

Hereinafter, operation of such multiple effective evaporation equipment in a steam reheating method according to the present invention will be explained.

When the evaporation water 40 is supplied to the evaporating chamber of the respective evaporator via the horses 41, 42, and 43, the external tube 36 of the double tube typed heat exchanging units 3a, 3b, 3c, 3d, 3e, and 3f, and the throttle valve 44 for adjusting a fluid, a high temperature evaporation (about 110 C) from a solar heat, or a general steam boiler is provided to a steam heating chamber 12 of the first evaporator 1a. The high temperature evaporation provided to the steam heating chamber 11 makes 12 the heat exchange boundary face 13 of the first evaporator 1a to be heated so as to make the evaporation water of the evaporating chamber to be heated and thereby generating a steam. When the steam generated from the evaporating chamber is provided to the first steam reheating unit 2a, the steam from the steam reheating unit is provided to the steam heating chamber 12 of the second evaporator 1b after changed into a high temperature steam (about 110° C.) by reheating and then makes an evaporation water at the second evaporating chamber 11 to be heated, resulting in being changed into a high temperature steam. Successively, high temperature steam is provided to the steam heating chamber 12 of the third evaporator 1c to heat evaporation water at the third evaporating chamber 11 and generate a steam. The generated steam is provided to the third steam reheating unit 2c and re-heated therein to be changed into the high temperature steam. If the successive evaporator 1 next to the corresponding evaporator 1 is the last evaporator 1, a steam generated from the last evaporating chamber 11 of the last evaporator 1 is provided to the last steam reheating unit 2f to being changed into a high temperature steam. The high temperature steam makes evaporation water at the evaporating chamber to be heated more, resulting from being supplied to the steam heating chamber 12 of the first evaporator 1a. The high temperature steam flowed into the evaporating chamber 11 of the respective evaporator 1 is heat-exchanged with an evaporation water and then condensed to be changed into a high temperature distillation water. At the exterior of the respective evaporator, being drained through the internal tube of double tube typed heat exchanging units in the respective evaporator, simultaneously with cross-encountering with the high temperature distillation water. This is to make to be preheated and thereby enhancing evaporation efficiency.

In addition, many applications and modifications may be used by those skilled in the art within the scope of basic technical spirit of the present invention.

The invention claimed is:

1. A method of evaporating liquid in a liquid evaporating system which comprises heat exchangers, multieffect evaporators, and steam reheaters, the method, comprising:
preheating condensed water in the heat exchangers;
distilling in the evaporators the preheated condensed water from the heat exchangers, wherein the evaporators each has a horizontal plane evaporating chamber at an upper side thereof and a horizontal plane steam heating chamber at a lower side thereof, wherein heating steam is provided from an external boiler to the heating chamber,
exchanging heat between the evaporating chamber and the heating chamber using a heat exchange boundary face formed in a concavo-convex shape, wherein the heat exchange boundary face is formed of a metal plate; and
reheating in the steam reheaters the steam from the respective evaporators, wherein the reheaters each are coupled to a subsequent one of the heating chambers to serve as a heating source of the subsequent heating chamber.

2. The method claim 1, wherein PTC (parabolic trough concentration) or CPC (compound parabolic concentration) solar thermal collectors are used to supply steam to the heating chamber.

3. The method of claim 1, wherein the metal plate is formed of aluminum or copper.

4. A liquid evaporating system, comprising:
heat exchangers to preheat condensed water;
multieffect evaporators to distill the preheated condensed water, wherein the evaporators each has a horizontal plane evaporating chamber at an upper side thereof and a horizontal plane steam heating chamber at a lower side thereof, wherein heating steam is provided from an external boiler to the heating chamber;
a heat exchange boundary face formed in a concavo-convex shape to provide a exchange area to exchange heat between the evaporating chamber and the heating chamber, wherein the heat exchange boundary face is formed of a metal plate; and
steam reheaters to reheat the steam from the respective evaporators, wherein the reheaters each are coupled to a subsequent one of the heating chambers to serve as a heating source of the subsequent heating chamber.

5. The system of claim 4, wherein PTC or CPC solar thermal collectors are used to supply steam to the heating chamber.

6. The system of claim 4, wherein the metal plate is formed of aluminum or copper.

* * * * *